United States Patent [19]

Pierpoint et al.

[11] Patent Number: 4,461,977
[45] Date of Patent: Jul. 24, 1984

[54] SINGLE ZONE LIGHTING CONTROLLER

[75] Inventors: William Pierpoint, Camarillo; Dan M. Weeks, Ventura, both of Calif.

[73] Assignee: The United States of America as represented by the Secretary of the Navy, Washington, D.C.

[21] Appl. No.: 445,877

[22] Filed: Dec. 1, 1982

[51] Int. Cl.³ .......................................... H05B 37/02
[52] U.S. Cl. .................................. 315/159; 315/308; 315/360; 315/361; 340/573
[58] Field of Search ............... 250/214; 315/159, 360, 315/361, 308; 340/573

[56] References Cited

U.S. PATENT DOCUMENTS

| 4,135,116 | 1/1979 | Smith | 315/156 |
| 4,198,563 | 4/1980 | Eissner | 250/214 |
| 4,233,545 | 11/1980 | Webster et al. | 250/214 |
| 4,305,021 | 12/1981 | Schreiden | 315/159 |

Primary Examiner—Harold Dixon
Attorney, Agent, or Firm—Robert F. Beers; Joseph M. St. Amand

[57] ABSTRACT

The single zone lighting controller controls the lights in a zone or area by integrating external control signals for daylighting and occupancy with a local override function. The daylighting signal is from a master photoelectric control, and occupancy signal is from a time-clock or electronic occupancy sensor; the local override, activated by an occupant provides a fixed override period before the single zone lighting controlled again responds to the external control signals. Shortly before the override period is over, the single zone lighting controller warns the occupant, e.g., by blinking the lights that the override is about to end.

7 Claims, 3 Drawing Figures

SINGLE ZONE LIGHTING CONTROLLER

BACKGROUND OF THE INVENTION

This invention relates generally to automatic lighting control systems and particularly to a lighting system controlled by both daylighting (artificial and ambient) and occupancy patterns together with a local override function for the purpose of saving electrical energy.

An automatic lighting control system would be most efficient if a building interior were divided into zones based upon daylighting and occupancy patterns. Most lighting control systems switch the entire branch circuit and do not provide small zones of lights. To save energy, it is desirable to provide lighting controlled by both daylighting and occupancy, together with an override to temporarily provide additional light for occupants without permanently sacrificing energy savings from the automatic lighting control system.

SUMMARY OF THE INVENTION

This invention is an automatic lighting control system for a building whose interior is divided into zones based on daylighting and occupancy patterns. The power to the lights in each zone is switched on or off by a dedicated single zone lighting controller. The single zone lighting controller accepts inputs from other daylighting and/or occupancy controls. The single zone lighting controller turns the lights off if there is either sufficient daylight or if the zone is vacant, and turns the lights on if there is insufficient daylight and the room is occupied. In addition, the single zone lighting controller has an override switch which is used both to turn off all the lights in the zone and to turn on the lights for a fixed time period, after which the single zone lighting controller responds to the daylighting and occupancy inputs. The fixed time period can be set for any period from fifteen minutes to two hours, for example. If at the end of the fixed time period the daylighting and occupancy inputs would have the lights in the zone turn off, the single zone lighting controller will blink the lights in the zone for a fraction of a second, and leave the lights on for some predetermined time such as two minutes before switching over to the automatic system. This will warn the occupants that the lights are about to go off, and if desired, they can operate the override switch for another fixed period of time.

It is an object of the invention to provide a single zone lighting controller which integrates external daylighting control, external occupancy control, and local override control for maintaining high quality illumination while conserving energy and permitting temporary supplemental illumination as required.

DESCRIPTION OF THE PREFERRED EMBODIMENT

Figure 1:
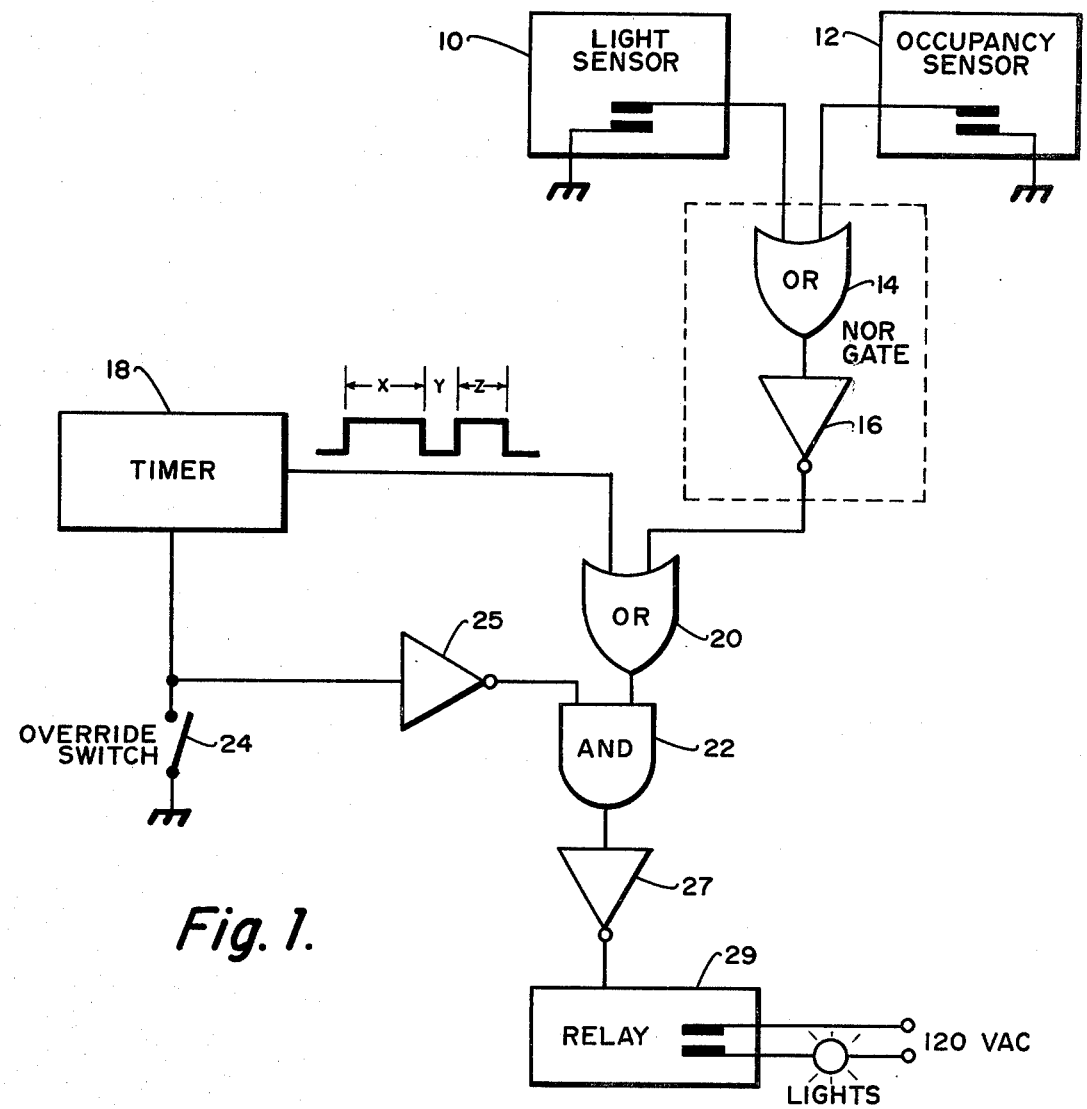
FIG. 1 shows a block diagram of a preferred embodiment of the single zone lighting controller.

To understand the basic operation of the single zone lighting controller, consider the simplified block diagram of FIG. 1 where two inputs from sensors, such as a photocell lighting control 10 and an occupancy control 12, for example, are used for sensing available light and occupancy in the zone. The inputs from sensors 10 and 12 are connected to an OR gate 14 which has an inverter 16 connected to the gate output. If the contacts in either of the sensors 10 or 12 are open there will be no input to the controller and the control circuit will indicate that the lights should be turned OFF. If both sensors 10 and 12 have their contacts closed, the control circuit will indicate that the lights should be turned ON.

The combination of OR gate 14 and inverter 16 connected to the gate output performs as a NOR gate. Insufficient daylight will close the contacts in sensor 10 and zone occupancy will close the contacts in sensor 12. If the contacts in either sensor 10 or 12 are open, the output of inverter 16 will be low, indicating that lights need not be ON. The output of inverter 16 will be high only when the contacts in both sensors 10 and 12 are closed, thus indicating that the lights should be ON.

The output of inverter 16, along with the output of timer 18, are connected to the inputs of OR gate 20, as shown. Timer 18 is part of the override circuitry. A high output from timer 18 indicates that lights should be ON. The output of gate 20 will be high if either of the inputs from timer 18 or inverter 16 are high. The output from OR gate 20 is fed to the input of AND gate 22.

An override switch 24 is connected to the input to timer 18 and also, through an inverter 25, to an input of AND gate 22 whose output is connected to inverter 27. When the override switch 24 is opened, the timer 18 is reset and a low input from inverter 25 is provided to AND gate 22. This results in a low output from AND gate 22, which in turn causes the output from inverter 27 to be high. The output from inverter 27 is fed to solid state relay 29. A high input from inverter 27 will cause relay 29 contacts to open, thus turning lights OFF in the zone whenever override switch 24 is opened.

Closing override switch 24 operates to start the timer 18 and the input to inverter 25 goes low (i.e., ground potential) and the output of inverter 25 to AND gate 22 will be high allowing any signal from OR gate 20 to pass. Timer 18 produces an output waveform, such as shown in FIG. 1, connected to an input of OR gate 20. The X portion of the waveform represents a preset override period, internally selectable for 15 minutes to 2 hours, for example. During this period zone lights will remain ON regardless of the control signals from the external control circuitry, i.e., sensors 10 and 12. At the end of the preset override period X, the output of timer 18 becomes low for a fraction of a second, i.e., during the Y portion of the waveform. If sensors 10 and 12 in the external control circuitry indicate that the zone lights should be OFF, by a low signal to OR gate 20, the zone lights will blink off for that fraction of a second during period Y. An additional two-minute interval, for example, during the Z portion of the waveform, is provided by timer 18 before its output goes continuously low. The zone occupant can use this two-minute interval to operate the override switch 24 for another preset override period if desired. Otherwise, once the output of timer 18 goes continuously low, the zone lights will be controlled by sensors 10 and 12 in the external control circuitry.

Figure 2:
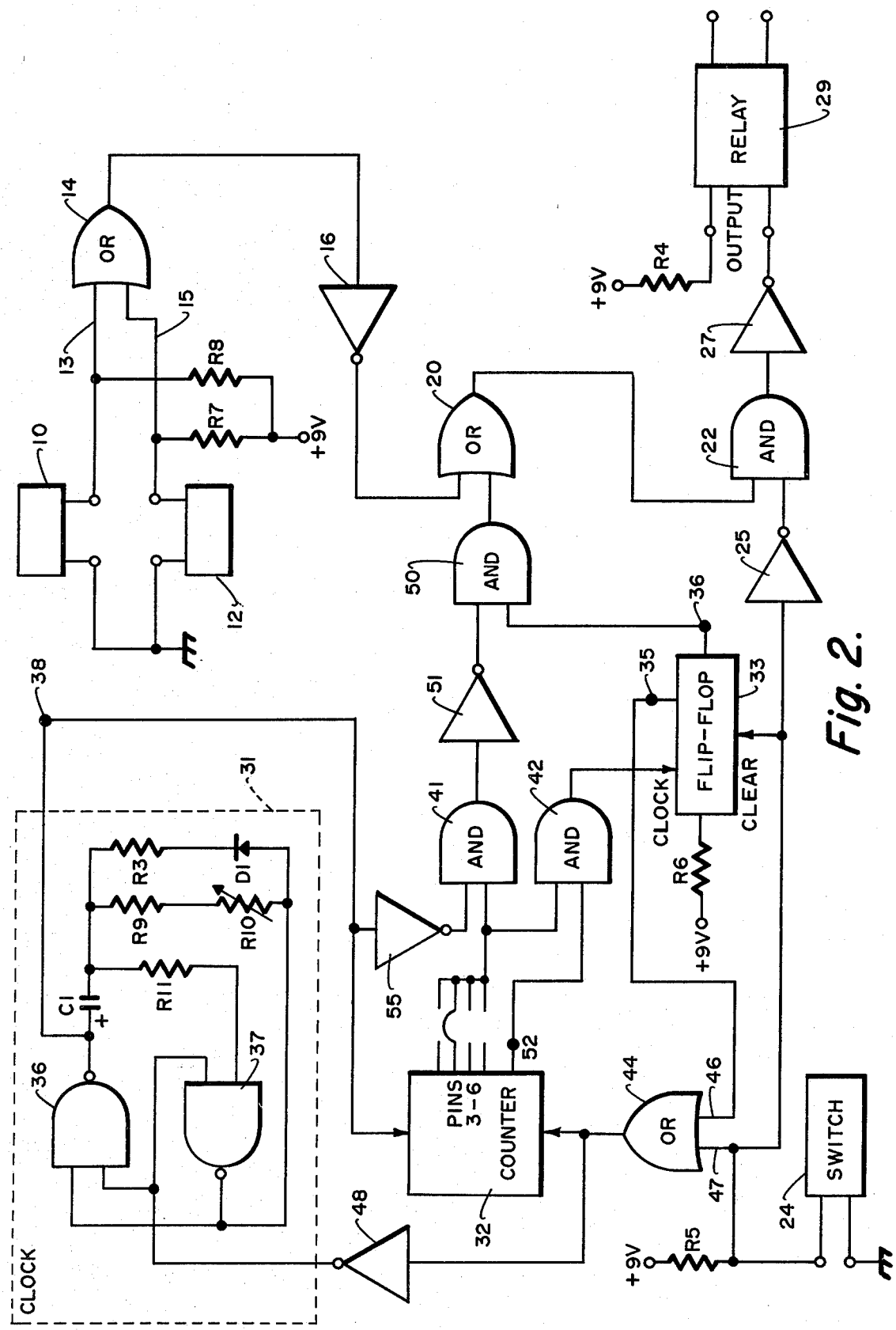
FIG. 2 is a circuit diagram of the single zone lighting controller of FIG. 1.

A circuit diagram of the single zone lighting controller is shown in FIG. 2. A regulated half-wave rectified power supply, for example, which is not shown, provides a +9 volts DC where indicated. Pull-up resistors R7 and R8 insure that there is a high on lines 13 and 15 to OR gate 14 when the contacts in sensors 10 and 12 are open. Pull-up resistor R4 operates to limit the current to solid state relay 29. This diagram shows the timer circuit in greater detail.

The timer circuit consists of three basic components: a clock 31, a counter 32, and a flip-flop 33. The clock circuit 31 consists of Schmitt triggers 36 and 37, along with diode D1, capacitor C1, and resistors R3, R9, R10 and R11. Schmitt triggers are used in this clock circuitry since they provide very fast rise and fall times on the clock output at 38. This is important when using CMOS integrated circuits. The clock is designed to have a duty cycle of about 200:1. The output high interval is determined by the values of C1, R9, and R10. These are chosen for an interval time of 112 seconds. Resistor R10 is a trimpot used to make adjustments in the high interval time. The output low interval is determined by values of diode D1, and resistors R9, R10 and R3. Since capacitor C1, and resistors R9 and R10 were chosen for the high interval, resistor R3 can be chosen for a low interval of about one-half second. Additional details on this type clock circuit can be found in the *CMOS Cookbook* by Don Lancaster, pages 226–230, published by Howard W. Sams & Co., Indianapolis, In., 1977.

Clock pulses are counted by a seven stage binary ripple counter 32. One of outputs, pins 3 through 6, is selected to choose the preset override period. For example, pin 6 counts seven clock cycles (¼ hour), pin 5 counts fifteen clock cycles (½ hour), pin 4 counts thirty-one clock cycles (1 hour), and pin 3 counts sixty-three clock cycles (2 hours).

Flip-flop 33 is a delay type flip-flop and is used as an electronic switch to turn off the clock (and counter) after the preset override period. The flip-flop has two outputs, 35 and 36. Outputs 35 and 36 are always in opposite logic states, one high and the other low. Pull-up resistor R6 operates to maintain a high on the delay input to flip-flop 33.

The timer circuit also has several other logic gates used to blink the lights shortly before the preset override period is over. The use of these gates can be better understood by following what happens once the override switch is operated. To simplify the discussion to follow, assume that pin 3 of counter 32 is jumpered to inputs to AND gates 41 and 42. When override switch 24 is opened, pull-up resistor R5 operates to provide a high on the CLEAR input to flip-flop 33 for resetting output 35, which is connected to input 46 of OR gate 44, to a low. At the same time, input 47 of OR gate 44 receives a high. The output of OR gate 44 is applied to counter 32 for resetting the counter to zero, and also is applied via inverter 48, to Schmitt triggers 36 and 37 to disable clock 31.

When the override switch 24 is closed, a low is sent to the CLEAR input of flip-flop 33, which enables the flip-flop. The flip-flop does not change its state, however, so output 35 remains low. Thus both inputs to OR gate 44 will be low, causing its output to be low. This will enable counter 32 and also start clock 31. Until the counter 32 counts 63 pulses from clock 31, pin 3 of counter 32 remains a low. Thus the output from AND gate 41 remains a low and the output from inverter 51 remains a high. Since the output from flip-flop 36 is also high during this time, both inputs of AND gate 50 are high, giving an output from AND gate 50 which is also a high. Thus the zone lights will be turned on regardless of the signals from the external control inputs 10 and 12.

The counter 32 is triggered on the negative edge of the clock cycle. After the sixty-third negative clock edge, pin 3 of counter 32 goes high. Pin 52, which changes state on every other clock negative edge, remains low Output 38 of Clock 31 is low at this point in time, giving a high output from inverter 55. This point in time is shown as $t_1$ in the timing diagram of FIG. 3.

Figure 3:
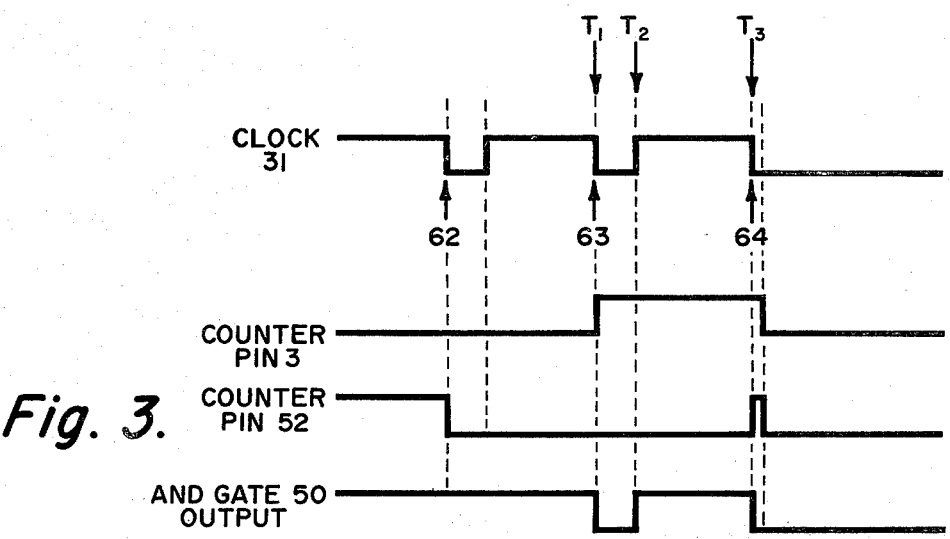
FIG. 3 shows a timing diagram for the single zone lighting controller.

With both inputs to AND gate 41 high, its output will go high, inverter 51 changes it to a low, which in turn causes the output of AND gate 50 to go low as shown in FIG. 3. The zone lights will blink OFF if the external controls 10 and 12 would turn off the lights at the end of the preset period (inverter 16 output low).

After the positive edge of the next close cycle ($t_2$ in FIG. 3), the output of inverter 55 goes low. This causes AND gate 41 to go low, inverter 51 to go high, and AND gate 50 to go high (since flip-flop output 36 remains high). Thus the zone lights would be ON regardless of the signals from the external control sensors 10 and 12.

Pin 52 of counter 32 goes high on the sixty-fourth negative clock edge ($t_3$ in FIG. 3). This causes the AND gate 42 output to go high. Since the AND gate 42 output is connected to the CLOCK input of flip-flop 33, the flip-flop changes state. Output 36 from flip-flop 33 then disables the time output by placing a low on an input of AND gate 50, and the high output at 35 resets counter 32 and disables the clock 31.

Thus the timer has been turned OFF until it is again enabled by operation of the override switch 24.

For a zone of light, the single zone lighting controller integrates three functions at one point: external daylighting control; external occupancy control; and local override control. The override switch provides a preset override interval, rather than a continuous override as found on other override switches. Near the end of the override interval, the single zone lighting controller blinks the lights (if the external control signals are set to turn lights off) to warn occupants that the override period is nearly over. The occupants can operate the override switch for another preset override period. At the end of the override period, the single zone lighting controller automatically switches over to operation governed by the external control sensors.

The single zone lighting controller circuitry can be provided with more than two external control sensors, to respond to external control voltages (rather than open or closed contacts), or to always blink off the lights near the end of the override period. A continuous override function can also be provided if desired. The single zone lighting controller can be constructed of TTL, CMOS, or other types of electronic logic circuitry. For some types of electronic logic, electrical isolation (such as rising opto-isolators) may be used at the external control inputs to eliminate ground currents.

Obviously many modifications and variations of the present invention are possible in the light of the above teachings. It is therefore to be understood that within the scope of the appended claims, the invention may be practiced otherwise than as specifically described.

What is claimed is:

1. A system for controlling lighting in a predetermined zone illuminated by natural light and/or artificial light and controlled by both lighting and occupancy paterns, together with a local override function, comprising:
   a. electronic switching means connected to one or more lighting devices in said predetermined zone;

b. a light sensing means, in said predetermined zone, connected to said electronic switching means;
c. an occupancy signal means, in said predetermined zone, connected to said electronic switching means;
d. said electronic switching means being operative to automatically switch on said lighting devices only when both said light sensing means indicates insufficient light in said predetermined zone and said occupancy signal means indicates occupancy of said predetermined zone; said electronic switching means being automatically operative to switch off said lighting devices when at least one of said light sensing means and said occupancy signal means indicates sufficient daylighting or no occupancy, respectively;
e. an override means operatively connected to said electronic switching means for overriding the indications of said light sensing means and said occupancy signal means for controlling said switching means to turn OFF the lighting devices in said zone and also to turn ON the lighting devices in said zone for a fixed period of time;
f. said override means, when operating to override and turn ON said lighting devices for a fixed time period, also operating to provide a signal to occupants in said predetermined zone when the fixed time period is about to end prior to switching OFF said lighting devices and reverting to automatic switching by said electronic switching means in response to said light sensing means and said occupancy signal means.

2. A single zone lighting control system as in claim 1 wherein photodetector means is used to sense the amount of daylighting in the predetermined zone to be illuminated.

3. A single zone lighting control system as in claim 1 wherein said occupancy signal means is a timeclock.

4. A single zone lighting control system as in claim 1 wherein said occupancy signal means senses motion or movement of occupants.

5. A single zone lighting control system as in claim 1 wherein a building is divided into a plurality of zones, the lighting in each zone being controlled by individual such systems.

6. A single zone lighting control system as in claim 1 wherein said override means includes electronic clock and counter means.

7. A single zone lighting control system as in claim 1 wherein override means is manually operated by occupants in said predetermined zone.

* * * * *